No. 812,668. PATENTED FEB. 13, 1906.
R. MORAN.
POWER PLANT.
APPLICATION FILED FEB. 18, 1905.

3 SHEETS—SHEET 1.

Figure 1:
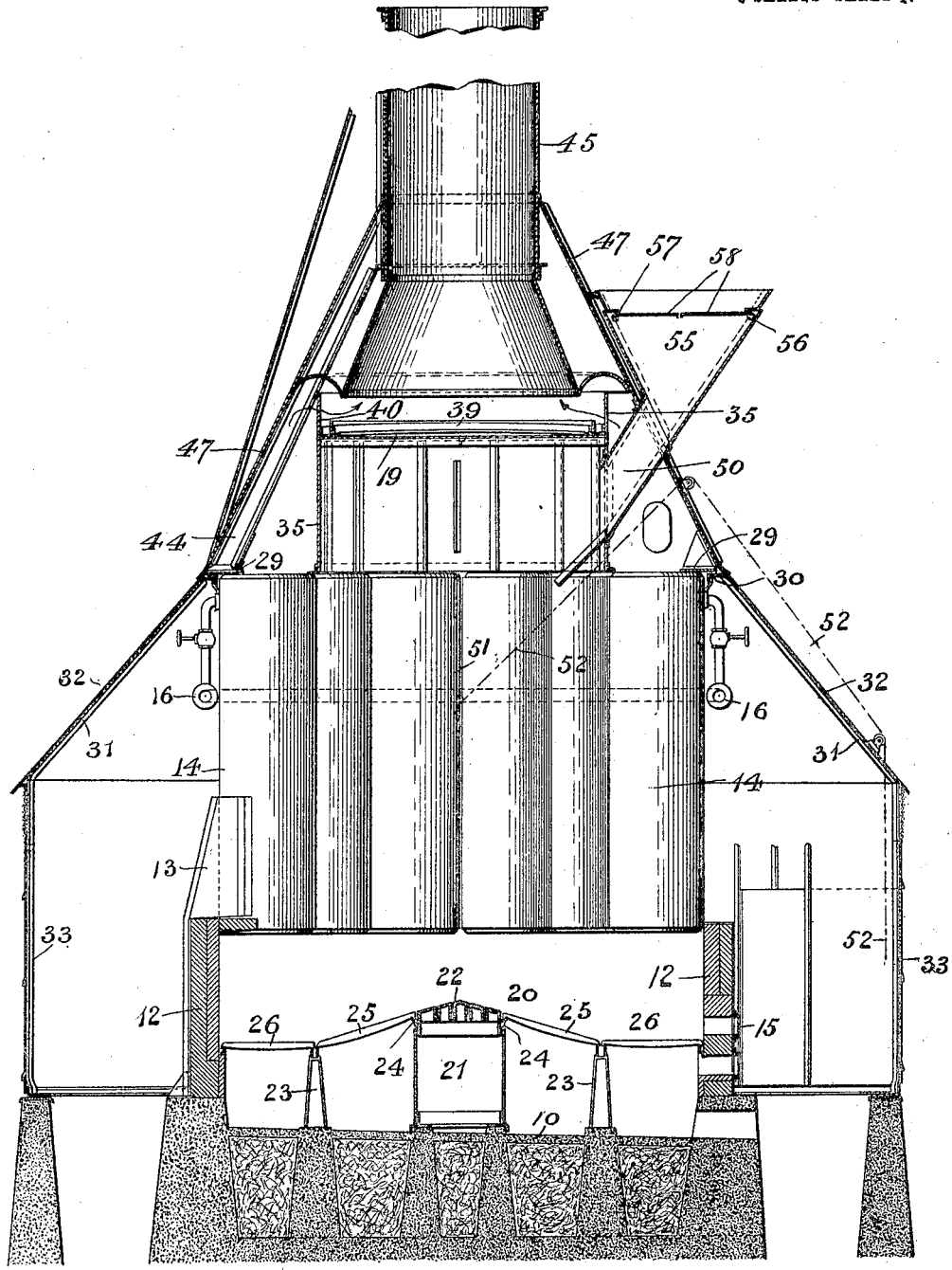

WITNESSES: Fig. 1. INVENTOR
Franck L. Ourand. Robert Moran
Wm. J. Whalley. BY
Sturtevant & Greeley
Attorneys No. 812,668. PATENTED FEB. 13, 1906.
R. MORAN.
POWER PLANT.
APPLICATION FILED FEB. 18, 1905.

3 SHEETS—SHEET 2.

WITNESSES:
Franck L. Ourand,
Wm. J. Whalley.

INVENTOR
Robert Moran
By Sturtevant & Freeley
Attorneys

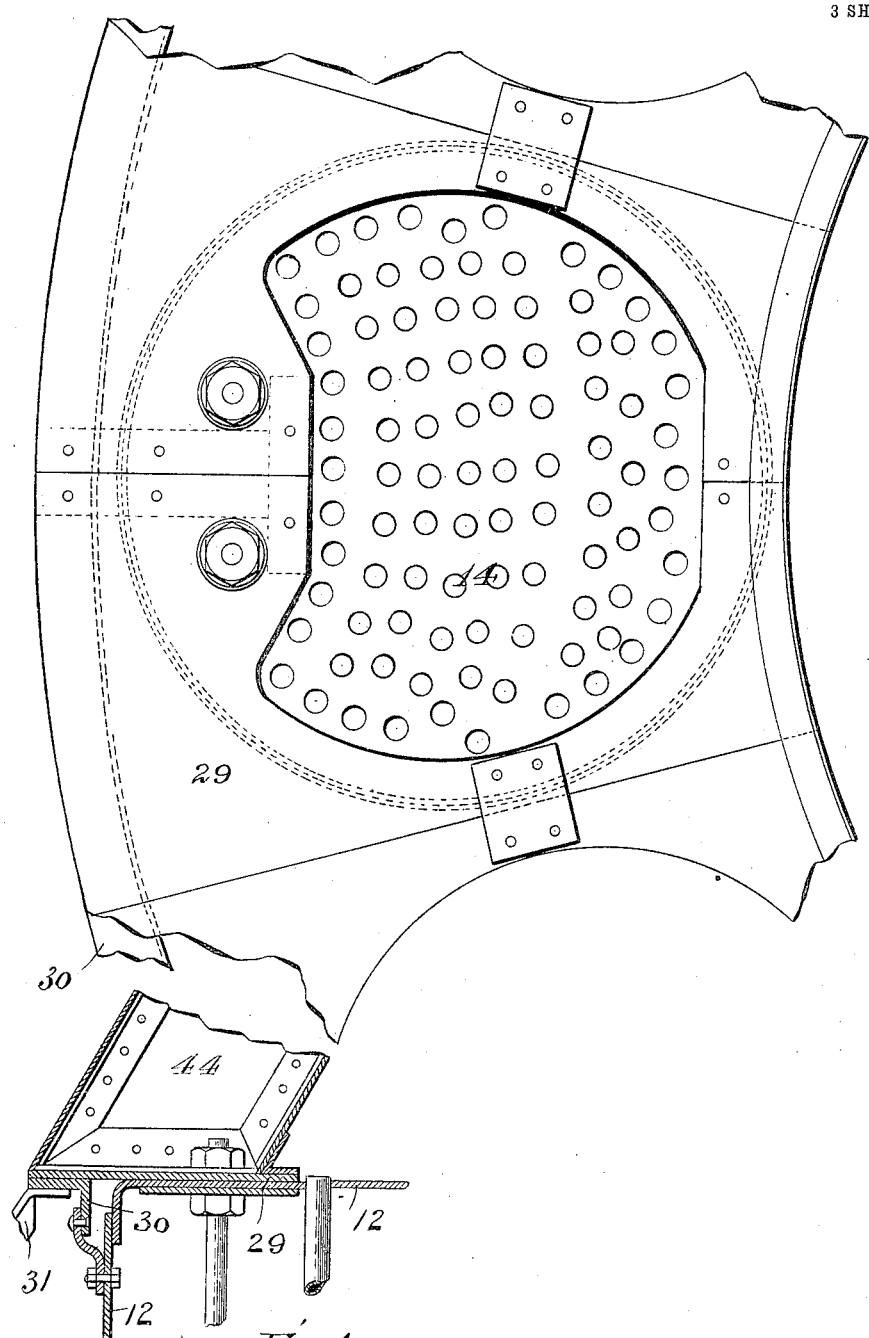

UNITED STATES PATENT OFFICE.

ROBERT MORAN, OF SEATTLE, WASHINGTON.

POWER PLANT.

No. 812,668.      Specification of Letters Patent.      Patented Feb. 13, 1906.

Application filed February 18, 1905. Serial No. 246,241.

*To all whom it may concern:*

Be it known that I, ROBERT MORAN, a citizen of the United States, residing at Seattle, in the county of King, State of Washington, have invented certain new and useful Improvements in Power Plants, of which the following is a description, reference being had to the accompanying drawings, and to the figures of reference marked thereon.

This invention relates to power plants, and has for its principal object to utilize in a thoroughly practical manner the waste products of sawmills and similar plants where there is an accumulation of refuse in the form of sawdust, bark, slabs, defective lumber, &c.

In the majority of sawmills where it is necessary to destroy the refuse special furnaces are built at considerable initial cost and entailing constant expense for labor and repairs. In some cases portions of the refuse may be utilized in a steam-boiler furnace; but the fuel in such cases requires special preparation.

The principal object of the present invention is to utilize the heat from combustion of all of the refuse for power, heating, and other purposes by providing a boiler-plant having a furnace into which all of the refuse may be dumped and consumed without special preparation.

A further object of the invention is to provide a battery of boilers so arranged that all may be heated from a single combustion-chamber and in which the boilers are so arranged as to form a part or all of the vertical wall of said chamber.

A still further object of the invention is to combine and arrange in a unitary structure a series of boilers having a common combustion-chamber and common escape-stack or flue, and, further, to so arrange the boilers with relation to the combustion-chamber and stack that all of the products of combustion will be compelled to pass through the flues of the boilers before escaping.

A still further object of the invention is to provide a structure of this character in which provision is made for feeding the fuel in bulk to a point about the center of the combustion-chamber, and thence provide for a more or less equal division or distribution of the fuel to points under or near the separate boilers.

A still further object of the invention is to provide a structure in which provision is made for separate hand-firing under the several boilers in case of necessity, and, further, to so construct the plant that in case of a shut-down of a portion or all of the plant one or more boilers may be readily divided off from the rest to keep up steam for small engines, pumps, heating, and like purposes.

A still further object of the invention is to provide a plant in which provision is made for carrying off the residue by means of a water-flush.

A still further object of the invention is to provide a self-contained unitary plant in which all of the boilers are housed in an inclosing fire-room containing the steam-pipes, pumps, gages, and the like and conveniently arranged for hand-firing.

With these and other objects in view, as will more fully hereinafter appear, the invention consists in the novel construction and arrangement of parts hereinafter described, illustrated in the accompanying drawings, and particularly pointed out in the appended claims.

Figure 2:
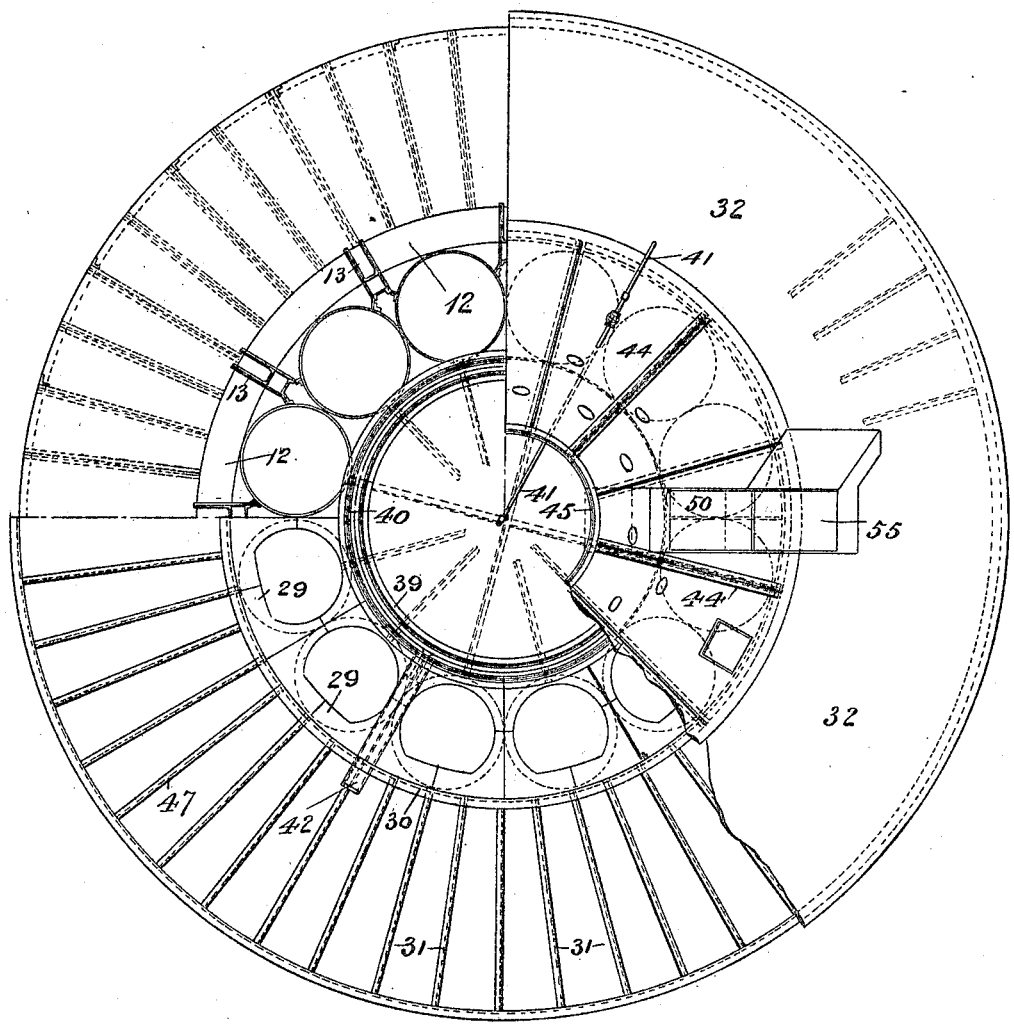

In the accompanying drawings, Figure 1 is a vertical sectional view of a boiler-plant constructed in accordance with the invention. Fig. 2 is a plan view, parts broken away. Fig. 3 is a detail plan of the top of one of the boilers, showing the large opening to expose the flue-sheets. Fig. 4 is a detail section of the same.

Similar numerals of reference are employed to indicate corresponding parts throughout the several figures of the drawings.

The base or foundation is formed of concrete or masonry and has an inclined flooring 10, constituting the bottom of the ash-pit, this flooring being so arranged that the residue falling from the grate may be readily carried away by a water-flush, this, however, depending on the situation of the plant and local conditions generally. Upon this is built the lower portion of the wall of the combustion-chamber 12, the latter being shown as circular in form in the present instance. This wall is provided with heavy brackets 13, which serve as supports for a battery of boilers 14. In the present case the boilers are of the vertical-tube type and are arranged in a continuous annular series, so that they form the upper portion of the wall of the combustion-chamber, and in the lower portion of each wall are formed fire-doors 15, one under each boiler to permit hand-firing, should occasion require. The boilers are all connected to a common steam-main 16, the branches to each boiler being valved to permit the cutting out of any one or more boilers, especially when only one or two are in use, and similar water-feed connections are also made to insure a uniform water-level. The top of the combustion-chamber, as will more fully hereinafter appear, is closed by a plate 19, and fuel is fed in through an opening in the top and dumped at an approximately central point in the chamber. The bottom of the combustion-chamber is formed by a grate 20, that is formed of a number of main sections.

Rising from the center of the ash-pit floor is a cylinder 21, carrying a conical head 22, formed, preferably, of heavy castings, and surrounding the cylinder is an annular series of standards 23, which are of a height less than that of the cylinder. The cylinder-head carries an annular flange 24, which may be formed of angle-iron, and this, in connection with the standards, supports an inner grate-section 25. Between the standards and the wall of the combustion-chambers extend the members of the outer grate-section 26, these being preferably horizontal and disposed at some distance below the bottoms of the boilers, so that there is ample opportunity for active combustion below the boilers. It will be noted that the members of the inner grate-section incline downward on lines following approximately the angle of the conical head, so that the refuse falling on the latter will have a tendency to slide outward toward the outer grate-section, thus leveling the fuel and by its sliding movement permitting the loosening and falling of residue through the grate.

On top of each boiler is secured a plate 29, having a large central opening to leave the upper flue-sheet free and permit the passage of the products of combustion, and these sheets are connected in a continuous annular series by angle-irons and bolting-plates. The outer angle-iron 30 extends continuously around and is secured to all of the boilers, and to this are also secured the upper ends of inclined bars 31, forming a frame for the support of the roof-plates of the boiler-house 32.

The outer wall 33 of the boiler-house is of any suitable construction and may be provided with doors and windows of any ordinary type.

Extending upward from the inner edge of the series of plates 29 is an annular wall 35, which really forms the upper portion of the combustion-chamber, the top of the latter, as previously described, being closed by the plate or plates 19. The upper edge of the wall 35 is extended considerably above the top 19 and forms a part of the spark-arrester.

The top 19 supports or it may form the bottom of a water-tank 39, having side walls 40. This tank serves to catch the sparks and at the same time protects the top of the combustion-chamber from injury through overheating.

Leading upward from the outer angle-bar 30 at the outer edges of the boilers are a number of inclined struts 44, which serve as supports for a stack 45, that may be of any suitable height. The lower end of the stack is somewhat flared and is located directly above the water-tank. The struts 44 are preferably made of structural iron. To the outer portions thereof are secured a series of plates 47, which direct the products of combustion from the boiler-flues up into contact with an annular deflecting-hood that extends over the edge of the water-tank and has its inner edge secured to the lower flared edge of the stack. The function of this hood is to direct the products of combustion down against the surface of the water, and any sparks or heavy particles will fall into the water and be carried away, so that there will be no danger of starting accidental fires by sparks from the top of the stack.

The fuel in the shape of bark, sawdust, slabs, &c., is fed into the upper portion of the combustion-chamber through a chute 50 and strikes against a suitable deflecting-plate 51, which may be adjusted by chains 52, in order to direct the fuel in the proper course. At the upper end of the chute is a hopper 55, having at its upper edge two pairs of brackets forming bearings for rock-shafts 56 and 57. These shafts carry doors or covers 58.

With a plant of the character described all refuse may be destroyed and its heat-producing properties utilized to the best advantage and without the necessity of preparing the fuel by special machinery.

While the construction of the plant has been described with considerable minuteness, it is to be understood that the number and arrangement of the boilers, their particular arrangement, and the general structure of the plant as a whole may be altered to suit varying local and other conditions without departing from the invention.

Having thus described the invention, what I claim, and desire to secure by Letters Patent, is—

1. The combination with a combustion-chamber, of a battery of boilers arranged closely together and forming an inclosing wall therefor, and a continuous fuel-supporting surface under all of the boilers.

2. The combination with a combustion-chamber, of a grate forming the bottom of the combustion-chamber, a battery of boilers arranged closely together and forming an inclosing wall for said chamber, and means for supporting the boilers above the level of the outer portion of the grate.

3. The combination with a combustion-chamber, of a grate forming the lower wall of the combustion-chamber, and inclining downward from a central point to the outer edge, a battery of boilers arranged closely together and forming the vertical wall of the combustion-chamber, and means for supporting the boilers above the grate.

4. The combination with a combustion-chamber having a closed top, of a grate forming the bottom of the combustion-chamber, a battery of upright tubular boilers having their lower ends supported above the grate, an annular casing having a closed top forming a closure for the top of the combustion-chamber, and a stack with which the upper ends of said boilers communicate.

5. The combination with a combustion-chamber having a closed top, of a chute for discharging fuel to the central portion of the chamber, a grate forming the bottom of the combustion-chamber and having a raised central portion onto which the fuel falls and from whence it is deflected outward, and a battery of boilers arranged closely together and forming the outer wall of the combustion-chamber.

6. The combination with a combustion-chamber having a closed top, of a fuel-chute leading through the top and arranged to discharge fuel to the central portion of the combustion-chamber, a grate having a raised central portion on which the fuel falls, a battery of tubular boilers having their lower ends above the grate-surface, a closure for the top of the central portion of the combustion-chamber, and a stack with which the upper ends of the boilers communicate.

7. In a boiler plant, a vertical wall surrounding the ash-pit and lower portion of the combustion-chamber, a grate, a battery of boilers supported by said wall and forming the upper part of the wall of the combustion-chamber, a connected series of plates secured to the tops of the boilers, a vertical partition extended upward from the inner edges of the series of plates, a water-tank carried by said vertical partition, inclined struts extending upward from the outer line of the boilers, a stack supported by the struts at a point above the tank, and a casing, including a deflecting-hood, for directing the products of combustion over the edge of the tank, substantially as specified.

In testimony whereof I affix my signature in presence of two witnesses.

ROBERT MORAN.

Witnesses:
JAMES GIBSON,
HARRY W. KENT.